US011151205B2

(12) United States Patent
Arngren et al.

(10) Patent No.: US 11,151,205 B2
(45) Date of Patent: Oct. 19, 2021

(54) MANAGING AND INDEXING COMMUNICATION DATA, AND RECOMMENDING COMMUNICATION TYPE

(71) Applicant: TELEFONAKTIEBOLAGET LM ERICSSON (PUBL), Stockholm (SE)

(72) Inventors: Tommy Arngren, Södra Sunderbyn (SE); Tor Kvernvik, Täby (SE); Yang Zuo, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 669 days.

(21) Appl. No.: 15/741,064

(22) PCT Filed: Jul. 2, 2015

(86) PCT No.: PCT/SE2015/050780
§ 371 (c)(1),
(2) Date: Dec. 29, 2017

(87) PCT Pub. No.: WO2017/003340
PCT Pub. Date: Jan. 5, 2017

(65) Prior Publication Data
US 2018/0189407 A1    Jul. 5, 2018

(51) Int. Cl.
*G06F 16/00* (2019.01)
*G06F 16/9535* (2019.01)
(Continued)

(52) U.S. Cl.
CPC ........ *G06F 16/9535* (2019.01); *G06F 16/219* (2019.01); *G06F 16/2228* (2019.01);
(Continued)

(58) Field of Classification Search
CPC ........... G06F 16/9535; G06F 16/24578; G06F 16/219; G06F 16/2228; G06F 16/313;
(Continued)

(56) References Cited

U.S. PATENT DOCUMENTS 8,335,833 B1    12/2012  Parkinson
2002/0073210 A1*  6/2002  Low ...................... G06Q 40/04
709/228

(Continued)

FOREIGN PATENT DOCUMENTS

| EP | 2680165 A1 | 1/2014 |
|---|---|---|
| JP | 2001043241 A | 2/2001 |
| WO | 2015043288 A1 | 4/2015 |

OTHER PUBLICATIONS

International Search Report and Written Opinion issued in Application No. PCT/SE2015/050780 dated Mar. 9, 2016, 10 pages.

(Continued)

*Primary Examiner* — Thanh-Ha Dang
(74) *Attorney, Agent, or Firm* — Sage Patent Group

(57) ABSTRACT

It is presented a method for managing communication data. The method is performed by a connection manager server (20) and comprising the step of: causing store (41) of historical communication data, for a communication session between a user and one or more contacts, into a database (13), wherein the historical communication data comprises communication data, a session identifier, a communication type, a communication context, and a user identifier for each contact having participated in the communication session. Methods for indexing communication data, and for recommending a communication type, are also presented. Corresponding connection manager servers (20), computer programs (64, 65) and a computer program product (62, 63) are also presented.

9 Claims, 9 Drawing Sheets

(51) Int. Cl.
*G06N 20/00* (2019.01)
*G06F 16/21* (2019.01)
*G06F 16/22* (2019.01)
*G06F 16/2457* (2019.01)
*H04L 12/58* (2006.01)
*G06F 16/31* (2019.01)

(52) U.S. Cl.
CPC ....... *G06F 16/24578* (2019.01); *G06N 20/00* (2019.01); *H04L 51/16* (2013.01); *H04L 51/32* (2013.01); *H04L 51/36* (2013.01); *G06F 16/313* (2019.01)

(58) Field of Classification Search
CPC ......... H04L 51/32; H04L 51/36; H04L 51/16; G06N 20/00
USPC ........................................................ 707/730
See application file for complete search history.

(56) References Cited

U.S. PATENT DOCUMENTS

| | | | | |
|---|---|---|---|---|
| 2006/0224587 | A1* | 10/2006 | Zamir | G06F 16/24578 |
| 2007/0282940 | A1* | 12/2007 | Sakurai | G06Q 10/107 |
| | | | | 709/202 |
| 2008/0228740 | A1* | 9/2008 | Weiss | G06F 16/955 |
| 2009/0019021 | A1* | 1/2009 | Davies | G06F 16/313 |
| 2010/0146588 | A1 | 6/2010 | Bergerson et al. | |
| 2012/0221638 | A1* | 8/2012 | Edamadaka | G06Q 50/01 |
| | | | | 709/204 |
| 2013/0066978 | A1 | 3/2013 | Bentley et al. | |
| 2013/0073473 | A1* | 3/2013 | Heath | G06Q 30/06 |
| | | | | 705/319 |
| 2013/0155889 | A1 | 6/2013 | Brownworth et al. | |
| 2013/0253989 | A1 | 9/2013 | Barhate et al. | |
| 2014/0105181 | A1 | 4/2014 | Milam et al. | |
| 2014/0188766 | A1* | 7/2014 | Waldman | G06Q 30/0255 |
| | | | | 705/400 |
| 2016/0050167 | A1* | 2/2016 | Ramachandran | G06Q 30/0242 |
| | | | | 709/204 |

OTHER PUBLICATIONS

The partial supplementary European Search Report issued in Application No. 15897287.7 dated Jun. 15, 2018, 16 pages.
European Search Report issued in corresponding EP Application No. 15897287.7 dated Sep. 26, 2018, 15 Pages.
European Office Action issued in corresponding EP Application No. 15897287.7 dated Jul. 9, 2019, 7 Pages.

* cited by examiner

MANAGING AND INDEXING COMMUNICATION DATA, AND RECOMMENDING COMMUNICATION TYPE

CROSS REFERENCE TO RELATED APPLICATION(S)

This application is a 35 U.S.C. § 371 National Stage of International Patent Application No. PCT/SE2015/050780, filed Jul. 2, 2015, designating the United States, the disclosure of which is incorporated by reference.

TECHNICAL FIELD

The invention relates to a method for managing communication data, a method for indexing communication data, a method for recommending a communication type, connection manger servers therefore, computer programs therefore, and computer program product therefore.

BACKGROUND

The alternative ways to communicate between users is growing and today the sender has the initiative and decides how to contact the recipients. Examples of communication applications are voice, Short Message Service (SMS), Multimedia Message Service (MMS), WhatsUp, SnapChat, Facebook, email, Lync, LinkedIn, Kik, Skype, and IM+. A sender may prefer a specific communication application, but it may be difficult for the sender to know if a recipient prefers another specific communication application.

A sender may search old conversations, but it may be difficult to manage the plurality of different communication applications.

EP1241853 describes a system and a method for identifying and establishing preferred modalities or channels for communication based on participants' preferences and capabilities.

SUMMARY

It is an object of the invention to improve handling of communication between users, wherein some embodiments enable the improved handling by facilitating search of communication data, and other embodiments enable the improved handling by facilitating selection of communication type.

According to a first aspect, it is presented a method for managing communication data. The method is performed by a connection manager server and comprises the step of: causing store of historical communication data, for a communication session between a user and one or more contacts, into a database, wherein the historical communication data comprises communication data, a session identifier, a communication type, a communication context, and a user identifier for each contact having participated in the communication session.

The method may further comprise the step of: causing receipt of the historical communication data from a user equipment.

The method may further comprise the step of: causing store of communication data for an ongoing communication session, to provide the historical communication data.

According to a second aspect, it is presented a method for indexing communication data of a communication session between a user and one or more contacts. The method is performed by a connection manager and comprises the steps of: causing determination of an importance factor for each of one or more content items for one or more content types of historical communication data for the communication session, wherein the historical communication data comprises a communication context causing determination of a thread factor for each of the one or more content items for the one or more content types of the historical communication data for the communication session; causing determination of a content item weight for each content item for each content type, based on the determined importance factor and the determined thread factor; and causing store of each content item, for each content type, in an index and associated with the content type, a session identifier, a communication context, and a content item weight.

The method may further comprise the steps of: causing identification of one or more content types of historical communication data of a communication session for the communication session; and causing identification of one or more content items for each identified content type.

The method may further comprise the step of causing store of historical communication data according to the first aspect.

The importance factor may be calculated as the number of contacts having participated in the communication session divided with the total number of contacts.

The thread factor may be calculated as the number of times each content item appear for the communication session, divided with the number of sessions.

The thread factor may further be dependent on a time window.

The content item weight may be calculated as the importance factor added to the thread factor, normalized to a content item weight interval.

The content type may be one or more of the following: text, speech, audio, picture and video.

The historical data may comprise one or more of the following: a session identifier, a user identifier for each contact having been part of the communication session, a group identifier, a communication type, a communication context, a user equipment type, and communication data.

According to a third aspect, it is presented a method for ranking a search query result from communication data indexed according to the second aspect. The method is performed by a connection manager server and comprises the steps of: causing reception of a search query item from a user equipment associated with a user and associated with a communication context; causing identification of one or more contacts of the indexed communication data, in dependence on the communication context, wherein the one or more contacts have had a communication session with the user equipment associated with the user; causing match of the search query item with indexed content items; causing rank of the matched indexed content items, in dependence of content item weight; and causing return of the ranked matched indexed content items associated with the search query item.

The rank for each matched indexed content items may be calculated as the content item weight added to a content item frequency.

The content item frequency may be calculated as number of times each indexed content item appear for all contacts of the user.

The communication context may comprise one or more of the following: user equipment, time of day, location, and accelerometer data.

According to a fourth aspect, it is presented a method for recommending a communication type to a user for a communication session. The method is performed by a connection manager server and comprises the steps of: causing reception of one or more contacts from the user; causing identification of a current communication context for the user and the one or more contacts, respectively; causing identification of a recommended communication type for the user and the one or more contacts, based on historical communication data; and causing return of the identified recommended communication type to the user.

The recommended communication type may be identified with a decision model. The method may further comprise a step of causing building the decision tree with historical communication data by machine learning from historical communication sessions of the user.

The step of causing identification of a recommended communication type may comprise identification of a ranked list of recommended communication types.

The method may further comprise the step of causing identification of, one or more of the following: a user equipment type, a group identifier, a communication type, and a content type, for the user and the one or more contacts, respectively.

The method may further comprise the step of causing setup of a communication session between the user and the one or more contacts based on the recommended communication type.

According to a fifth aspect, it is presented a connection manager server configured to manage communication data. The connection manger server comprises: a processor; and a computer program product storing instructions that, when executed by the processor, causes the connection manger server to: cause store of historical communication data, for a communication session between a user and one or more contacts, into a database, wherein the historical communication data comprises communication data, a session identifier, a communication type, a communication context, and a user identifier for each contact having participated in the communication session.

The instructions may comprise a further instruction to cause receipt of the historical communication data from a user equipment.

The instructions may comprise a further instruction to cause store of communication data for an ongoing communication session, to provide the historical communication data.

According to a sixth aspect, it is presented a connection manager server configured to index communication data of a communication session between a user and one or more contacts. The connection manager server comprises: a processor; and a computer program product storing instructions that, when executed by the processor, causes the connection manger server to: cause determination of an importance factor for each of one or more content items for one or more content types of historical communication data for the communication session, wherein the historical communication data comprises a communication context; cause determination of a thread factor for each of the one or more content items for the one or more content types of the historical communication data for the communication session; cause determination of a content item weight for each content item for each content type, based on the determined importance factor and the determined thread factor; and cause store of each content item, for each content type, in an index and associated with the content type, a session identifier, a communication context, and a content item weight.

The instructions may comprise further instructions to: cause identification of one or more content types of historical communication data of a communication session for the communication session; and cause identification of one or more content items for each identified content type.

The instructions may comprise a further instruction to cause store of historical communication data according to the fifth aspect.

The importance factor may be calculated as the number of contacts having participated in the communication session divided with the total number of contacts.

The thread factor may be calculated as the number of times each content item appear for the communication session, divided with the number of sessions. The thread factor may further be dependent on a time window.

The content item weight may be calculated as the importance factor added to the thread factor, normalized to a content item weight interval.

The content type may be one or more of the following: text, speech, audio, picture and video.

The historical data may comprise one or more of the following: a session identifier, a user identifier for each contact having been part of the communication session, a group identifier, a communication type, a communication context, a user equipment type, and communication data.

According to a seventh aspect, it is presented a connection manager server configured to rank a search query result from communication data indexed by the connection manger server according to the sixth aspect. The connection manager server comprising: a processor; and a computer program product storing instructions that, when executed by the processor, causes the connection manger server to: cause reception of a search query item from a user and associated with a communication context; cause identification of one or more contacts of the indexed communication data, in dependence on the communication context, wherein the one or more contacts have had a communication session with the user; cause match of the search query item with indexed content items; cause rank of the matched indexed content items, in dependence of content item weight; and cause return of the ranked matched indexed content items associated with the search query item.

The rank for each matched indexed content items may be calculated as the content item weight added to a content item frequency.

The content item frequency may be calculated as number of times each indexed content item appear for all contacts of the user.

The communication context comprises one or more of the following: user equipment, time of day, location, and accelerometer data.

According to an eights aspect, it is presented a connection manager server configured to recommend a communication type to a user for a communication session. The connection manager server comprises: a processor; and a computer program product storing instructions that, when executed by the processor, causes the connection manger server to: cause reception of one or more contacts from the user; cause identification of a current communication context for the user and the one or more contacts, respectively; cause identification of a recommended communication type for the user and the one or more contacts, based on historical communication data; and cause return of the identified recommended communication type to the user.

The recommended communication type may be identified with a decision model. The connection manager server may further comprise an instruction to cause build of the decision model with historical communication data by machine learning from historical communication sessions of the user.

The instruction to cause identification of a recommended communication type may comprise identification of a ranked list of recommended communication types.

The connection manager server may further comprise an instruction to cause identification of, one or more of the following: a user equipment type, a group identifier, a communication type, and a content type, for the user and the one or more contacts, respectively.

The connection manager server may further comprise an instruction to cause setup of a communication session between the user and the one or more contacts based on the recommended communication type.

According to a ninth aspect, it is presented a connection manager server arranged to manage communication data. The connection manger server comprises: a store manager for storing historical communication data, for a communication session between a user and one or more contacts, into a database, wherein the historical communication data comprises communication data, a session identifier, a communication type, a communication context, and a user identifier for each contact having participated in the communication session.

According to a tenth aspect, it is presented a connection manager server arranged to index communication data of a communication session between a user and one or more contacts. The connection manager server comprises: a determination manager for determining an importance factor for each of one or more content items for one or more content types of historical communication data for the communication session, wherein the historical communication data comprises a communication context; for determining a thread factor for each of the one or more content items for the one or more content types of the historical communication data for the communication session; and to determine a content item weight for each content item for each content type, based on the determined importance factor and the determined thread factor; and a store manager for storing each content item, for each content type, in an index and associated with the content type, a session identifier, a communication context, and a content item weight.

According to an eleventh aspect, it is presented a connection manager server arranged to rank a search query result from communication data indexed by the connection manger server according to the tenth aspect. The connection manager server comprises: a communication manager for receiving a search query item from a user and associated with a communication context; and a determination manager for identifying one or more contacts of the indexed communication data, in dependence on the communication context, wherein the one or more contacts have had a communication session with the user; for matching the search query item with indexed content items; and to rank the matched indexed content items, in dependence of content item weight; wherein the communication manager is for returning the ranked matched indexed content items associated with the search query item.

According to a twelfth aspect, it is presented a connection manager server arranged to recommend a communication type to a user for a communication session. The connection manager server comprises: a communication manager for receiving one or more contacts from the user; and a determination manager for identifying a current communication context for the user and the one or more contacts, respectively; and for identifying a recommended communication type for the user and the one or more contacts, based on historical communication data; wherein the communication manager is for returning the identified recommended communication type to the user.

According to a thirteenth aspect, it is presented a computer program for managing communication data. The computer program comprises computer program code which, when run on a connection manager server, causes the connection manager server to: cause store of historical communication data, for a communication session between a user and one or more contacts, into a database, wherein the historical communication data comprises communication data, a session identifier, a communication type, a communication context, and a user identifier for each contact having participated in the communication session.

According to a fourteenth aspect, it is presented a computer program for indexing communication data of a communication session between a user and one or more contacts. The computer program comprises computer program code which, when run on a connection manager server, causes the connection manager server to: cause determination of an importance factor for each of one or more content items for one or more content types of historical communication data for the communication session, wherein the historical communication data comprises a communication context; cause determination of a thread factor for each of the one or more content items for the one or more content types of the historical communication data for the communication session; cause determination of a content item weight for each content item for each content type, based on the determined importance factor and the determined thread factor; and cause store of each content item, for each content type, in an index and associated with the content type, a session identifier, a communication context, and a content item weight.

According to a fifteenth aspect, it is presented a computer program for ranking a search query result from communication data indexed by a computer program according to the fourteenth aspect. The computer program comprises computer program code which, when run on a connection manager server, causes the connection manager server to: cause reception of a search query item from a user and associated with a communication context; cause identification of one or more contacts of the indexed communication data, in dependence on the communication context, wherein the one or more contacts have had a communication session with the user; cause match of the search query item with indexed content items; cause rank of the matched indexed content items, in dependence of content item weight; and cause return of the ranked matched indexed content items associated with the search query item.

According to a sixteenth aspect, it is presented a computer program for recommending a communication type to a user for a communication session. The computer program comprises computer program code which, when run on a connection manager server, causes the connection manager server to: cause reception of one or more contacts from the user; cause identification of a current communication context for the user and the one or more contacts, respectively; cause identification of a recommended communication type for the user and the one or more contacts, based on historical communication data; and cause return of the identified recommended communication type to the user.

According to a seventeenth aspect, it is present a computer program product comprising a computer program and a computer readable storage means on which a computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The solution presented herein is a connection manager having access to communication context for a user and one or more of the user's contacts. A recommendation may be made based on preferred communication type for all parties of a communication session. Which application to use may thus depend on who, when and context. Managing conversations of text, images, and videos, and finding, particular from many different applications, communication sessions and content is cumbersome.

The connection manager enables conversational communication between users, on equal terms, based on the end users preferences, historical data and contexts. This will also enable users to search and find content, such as text, image, and video, within stored conversations.

Figure 1:
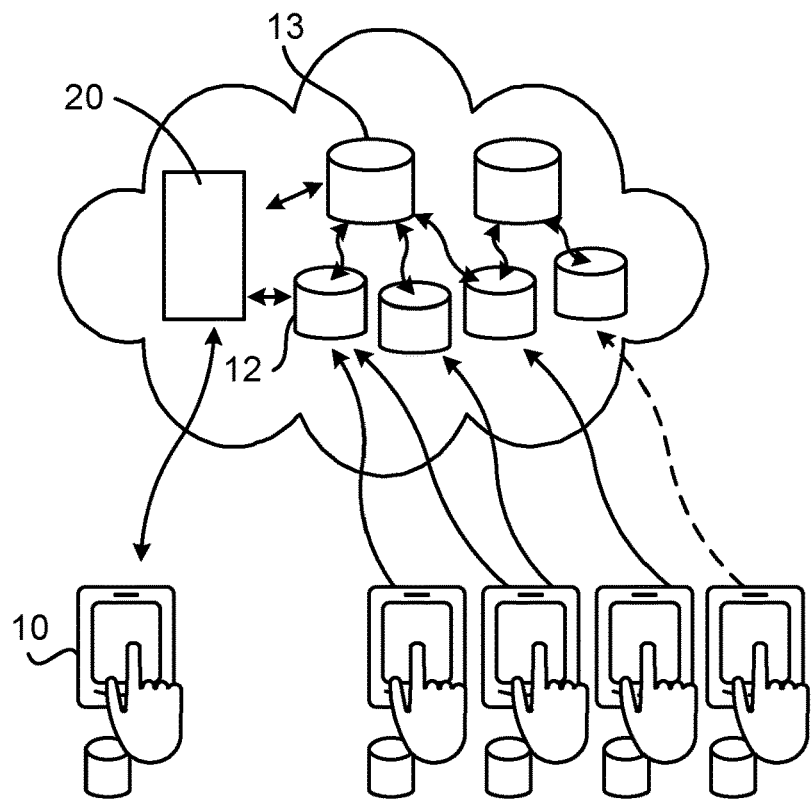
FIG. 1 is a schematic diagram illustrating an environment where embodiments presented herein can be applied.

An environment for a connection manager is schematically illustrated in FIG. 1.

A user uses a User Equipment (UE) 10, having one or more applications, such as for text, speech, audio, picture and video communication. The UE 10 logs actions taken by the user and interfaces with the connection manager on a connection manager server 20. The connection manager server 20 may be a dedicated server or utilize one or more server applications in a distributed manner.

The connection manger server 20 is cloud based, and interfaces with applications on a plurality of different UEs 10. The connection manager server 20 manages client data, historical data and conversational content for the different UEs 10. The connection manager server 20 further indexes and stores conversational data, facilitating search and ranking of search result.

Client data may be stored in one or more database 12, wherein a single user may be associated with different kinds of UEs, with different user patterns. The connection manager has access to the current context of each user, such as active application(s), geographical location and sensor data. The different kinds of UEs, or device types, may e.g. be smart phone, computer, tablet pc, game console, or IP TV.

Historical data may be stored in one or more database 13, having access to current context through the one or more client data databases 12. The connection manger has access to stored communication session data, comprising contacts and contexts between users via e.g. social network analysis and APIs to social apps such as Lync, Facebook and LinkedIn. A user communication type preference, based on historical usage, may comprise in the following order: clusters or user belonging in groups, wherein a cluster may be defined manually or machine learned, e.g. family, address, location, topic, etc, and wherein a cluster is associated with individual recommendation trees; digitally represented recommendation trees for each user, based on relations between UE, contact, context and application. The connection manager can index historical content from communication sessions. A demographic context may be context types such as age, city and gender. A subscription context may be context types such as prepaid, low cost and premium.

The connection manager may thus provide, or at least enable, an efficient method for recommendation of communication type based on individual recommendation trees. The connection manager may also make it possible to search and find relevant information from all content created in communications sessions, independent on applications, from a personal point of view.

Recommendation

The connection manager may be used to recommend or enable a recommendation of the most appropriate communication type for a user considering historic and client data. The communication type is the way two or more users can communicate with each other. At a general level, the communication type may simply be a content type such as text, speech, audio, picture or video. At a more detailed level, the communication type may be a specific application such as email, SMS or a certain software application including text communication, or a certain software application for video communication, e.g. Skype, Lync and WebEx.

Figure 2:
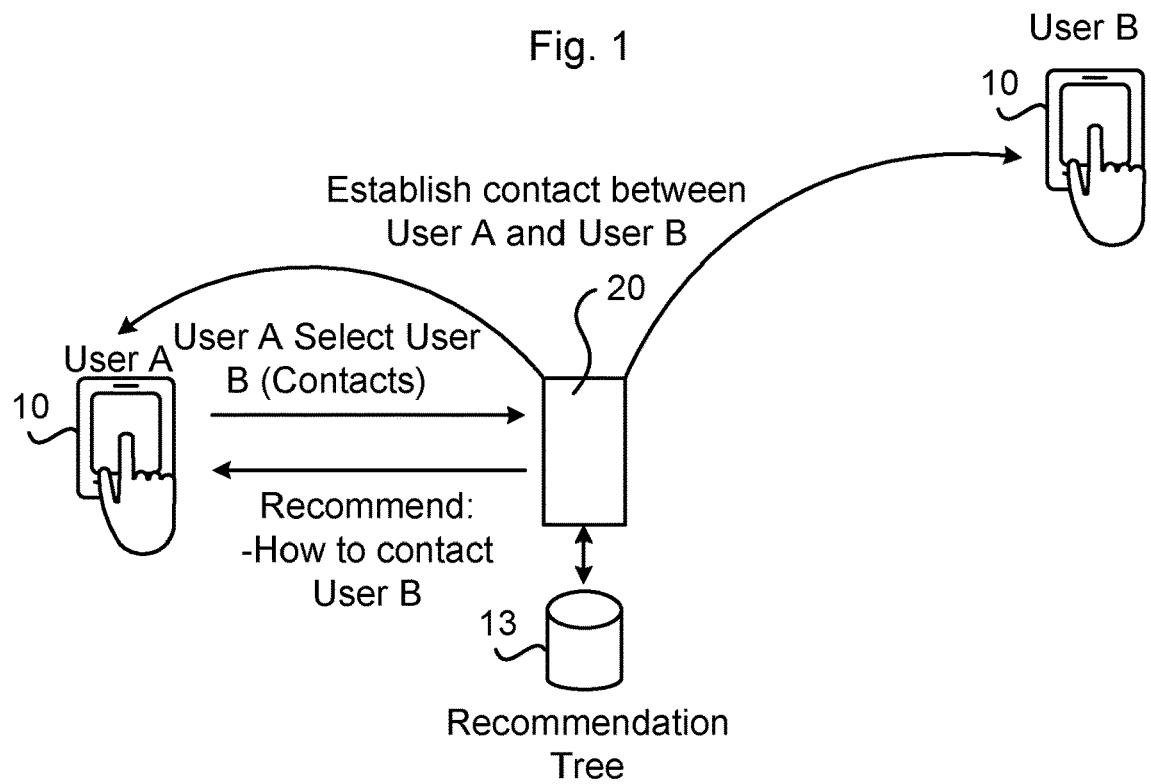
FIG. 2 is a schematic diagram illustrating establishment of conversational communication between end users for an embodiment presented herein.

The solution is schematically illustrated in FIG. 2. As a first step, a model is built by machine learning from historical data. This model is in this embodiment then used for recommendations. At start of a communication, as a second step, the model is used to classify which communication type that is most appropriate, as exemplified in FIG. 2.

User A selects User B for a communication, e.g. from an address book application of a UE 10. The address book application notifies the connection manager on the connection manager server 20. The connection manager checks a recommendation database 13, and recommends User A how to contact User B. The recommended communication type to contact User B is based on client data and historical data. The connection manager, or a client application on the UE 10, may setup communication between User A and User B.

Training of a Classification Model

Historic communication data of User A and User B, respectively, is used to build knowledge of communication preferences depending on situation into the recommendation database 13. One alternative for the recommendation database is to build a decision model in the form of a decision tree. Other alternatives for the recommendation database may be rules, if statements and tables.

Figure 3A:
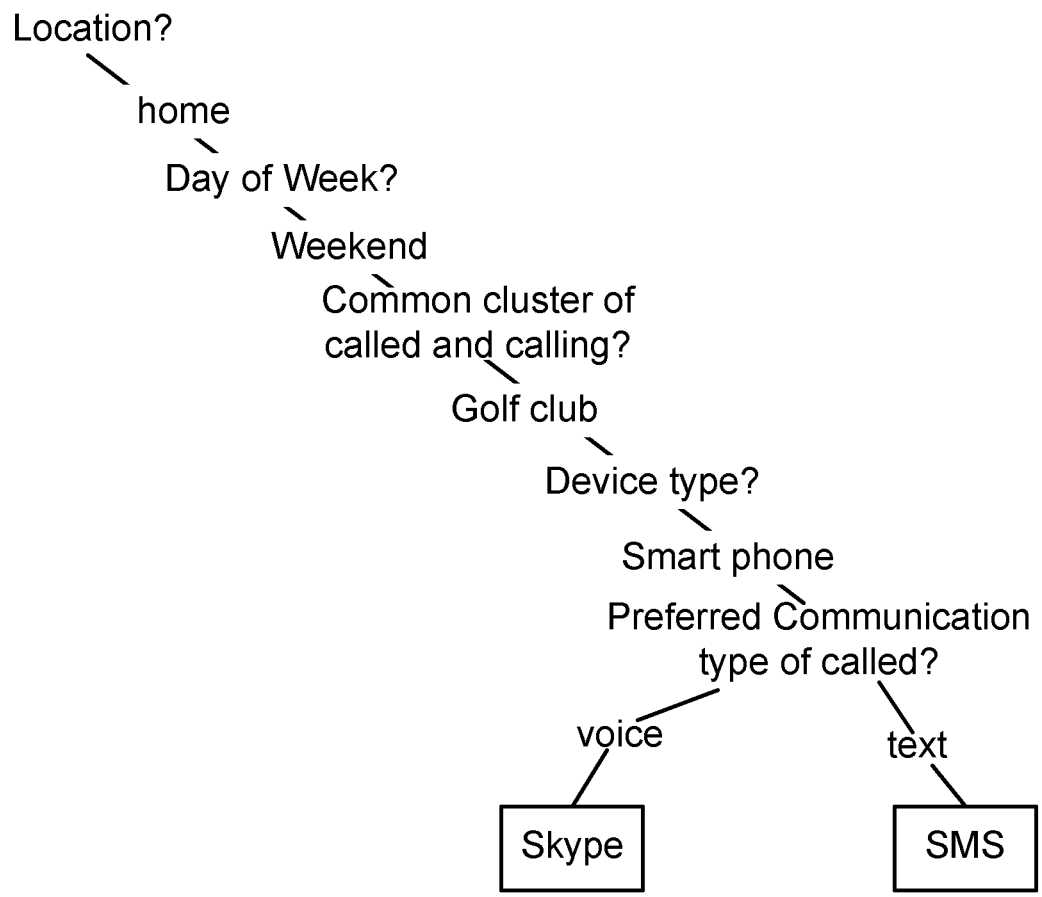
FIGS. 3a-3b are schematic diagrams showing decision trees for embodiments presented herein.

FIG. 3a shows how a classification of a prioritized communication type can be derived through a decision tree. At each level in the tree several options are possible, i.e. for location, day of week, common cluster of called and calling, device type, and preferred communication type of called. E.g. depending on location home/office, combined with day of week weekend/work day, combined with common cluster golf club/company, combined with device type smart phone/computer different options for a prioritized communication is proposed. A decision tree can capture the knowledge from lots of combinations. The properties get different priority depending on how high up the property is in the tree. A decision model in the form of a decision tree may be generated manually by experts via for example Prolog or automatically generated from training data. The training data may be generated from for example Calling Data Records (CDRs) or deep packet inspections.

Figure 5:
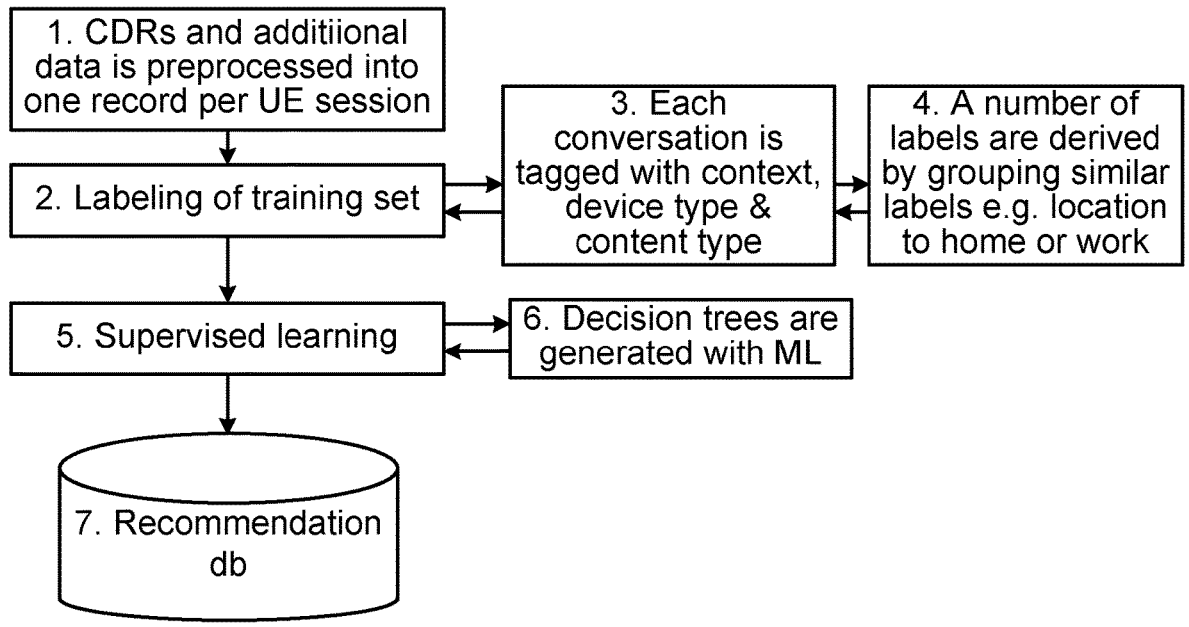
FIG. 5 is a schematic diagram illustrating training of a recommender database for an embodiment presented herein.

An example of training, or building, of a recommendation database is described with reference to FIG. 5. CDRs and additional data, such as communication context, device type and content type, are preprocessed into one record per UE communication session. The CDRs often comprises a lot of user related data, but further data such as geographical location and sensor data from the UE 10 may also be added into the record. A training set is made up by a plurality of records, one for each UE communication session. Next, the training set is labeled in the following way. Each communication session is tagged with communication context, device type and content type. Further, a number of decision labels are derived by grouping similar context labels, such as the decision label "location?" to similar context labels such as "home" or "work". Further labels may be time of day and application. A geographic position of home and work may be derived by analyzing the geographical coordinates during office hours vs evenings and weekends. When the training set is labeled, supervised learning is performed. Decision models in the form of decision trees are thereby generated with machine learning.

Figure 6:
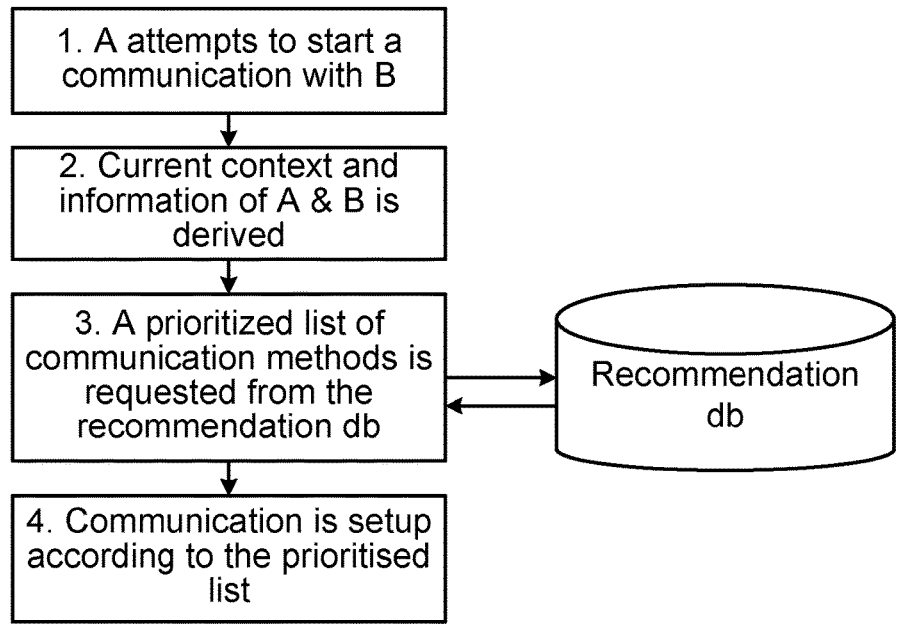
FIG. 6 is a schematic diagram illustrating a recommendation for a communication type for an embodiment presented herein.

At start of a new communication by a User A, a recommendation of a preferred communication type is performed. FIG. 6 shows an example how this can be done.

User A attempts to start a communication session with User B. A current context and additional information of User A and User B are then derived. Next a recommended communication type, or a prioritized list of recommended communication types, are requested from the recommendation database. The recommended communication type, or prioritized list of recommended communication types is then used to set up a communication session between User A and User B.

Figure 3B:
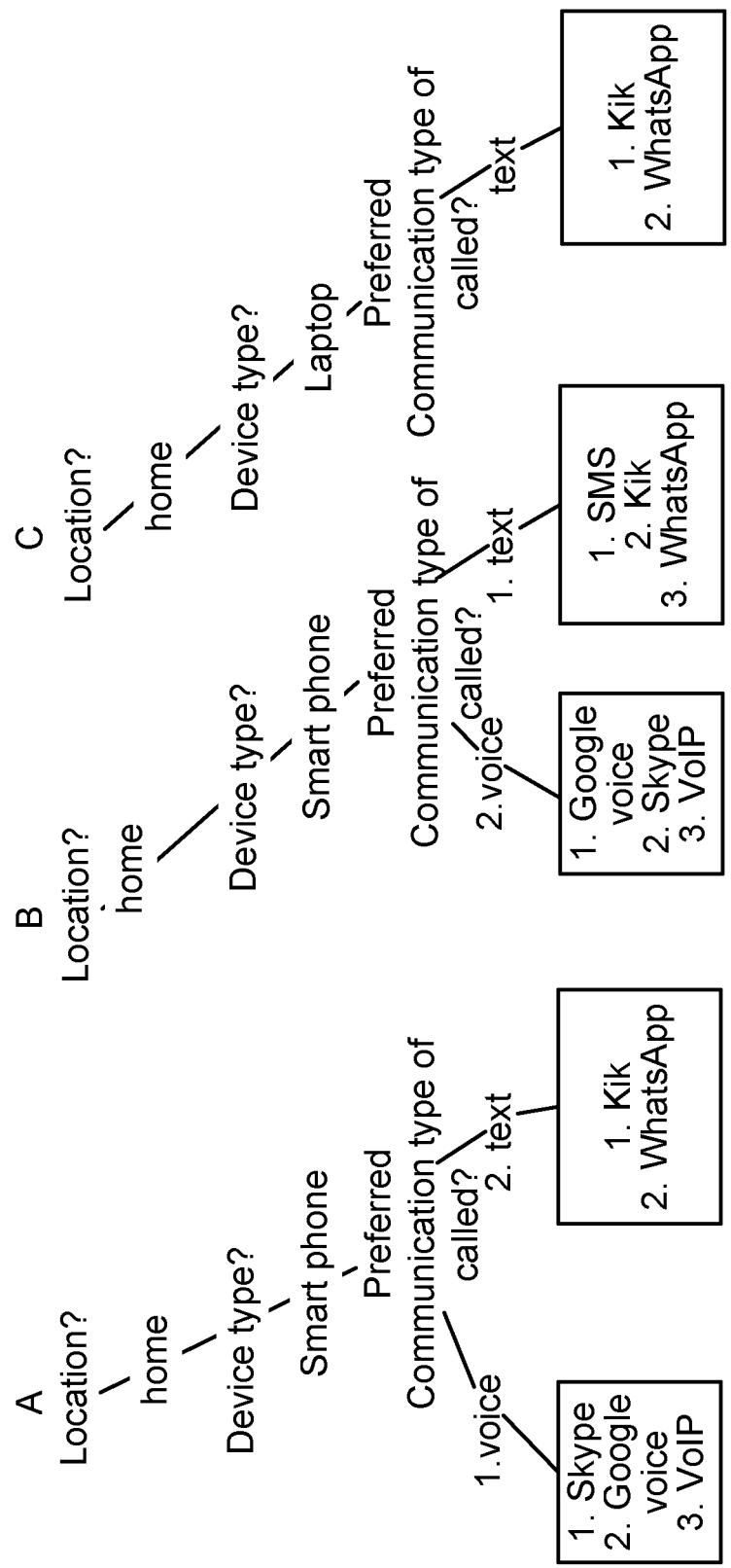

An example of how prioritized lists of recommended communication types, for individual users A, B and C may be generated is illustrated in FIG. 3b.

Based on current context and historical context, User A prefers voice communication, in the following communication type order Skype, Google voice and VoIP, and secondly text, in the following communication type order Kik and WhatsApp. Based on current context and historical context, User B prefers text communication, in the following communication type order SMS, Kik and WhatsApp, and secondly voice, in the following communication type order Google voice, Skype and VoIP. Based on current context and historical context, User C prefers text communication, in the following communication type order Kik and WhatsApp. For a communication session between User A, User B and User C a recommended communication type may be text through Kik, or a prioritized list of recommended communication types by text through Kik or secondly by text through WhatsApp.

Indexing and Search

It will be presented how to collect and index all content from communication sessions, independent of application, and make it searchable.

Figure 7:
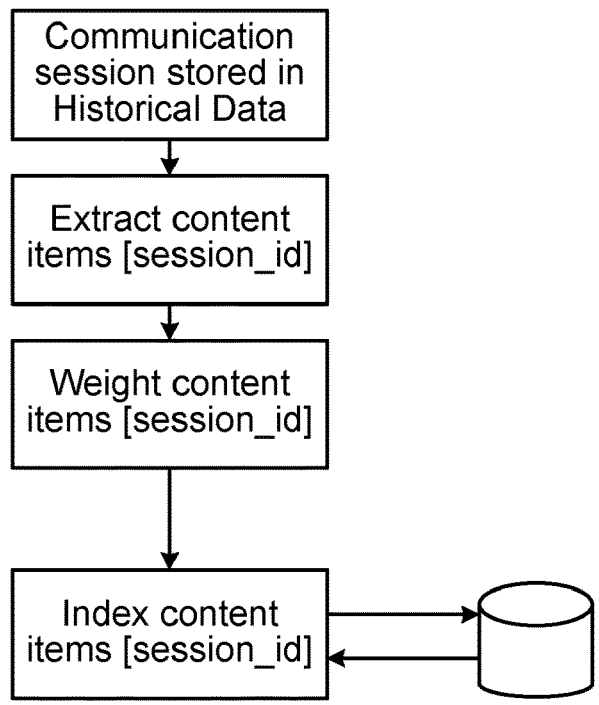
FIG. 7 is a schematic diagram illustrating indexing of communication data for an embodiment presented herein.

Indexing and Weighting is described with reference to FIG. 7.

Data generated during a communication session, with a session identity, session_id, is stored in a database. In addition to content, the data may further comprise the user, contacts, cluster, context, application and device. This provides historical data. For each session_id, a communication manager server analyzes, i.e. post processing, content used/created during the communication session. The communication manager server extracts content items, content_items related to each content type, content_type, using existing technologies like OpenCV and Speech to text. Content_type may be text, speech, audio, picture and video.

Each extracted content_item (content_type) is weighted using two weighting factors, an importance factor, I_fact, and a thread factor, T_fact, from the view of the user, i.e. a personal index.

The importance factor is calculated in the following way.

$$I\_Fact=\text{Number of contacts(session\_id)/(Total number of contacts)}$$

The importance factor is thus indicative of with how many of the contacts that were involved in the communication session.

The thread factor is calculated in the following way.

$$T\_Fact=\text{Sum of item}[n]/(\text{number of sessions(time\_window)})$$

n is number of content_item. The time_window is a parameter that can vary t-x<time_window<t+x, wherein t is the start time for the communication session. The thread factor is thus indicative of the frequency with which content_item appear for similar session parameters within a certain time_window.

The weight is calculated in the following way.

$$\text{Weight(content\_item}[1\text{-}n])=N(I\_Fact+T\_Fact) \text{ (e.g. } 0<\text{Weight}<10)$$

N is a normalization factor, which may be used to provide a weight between e.g. 0 and 10. Each content_item (content_type) is stored in an index and associated with session_id, contacts, context, application, device, cluster and weight.

Figure 8:
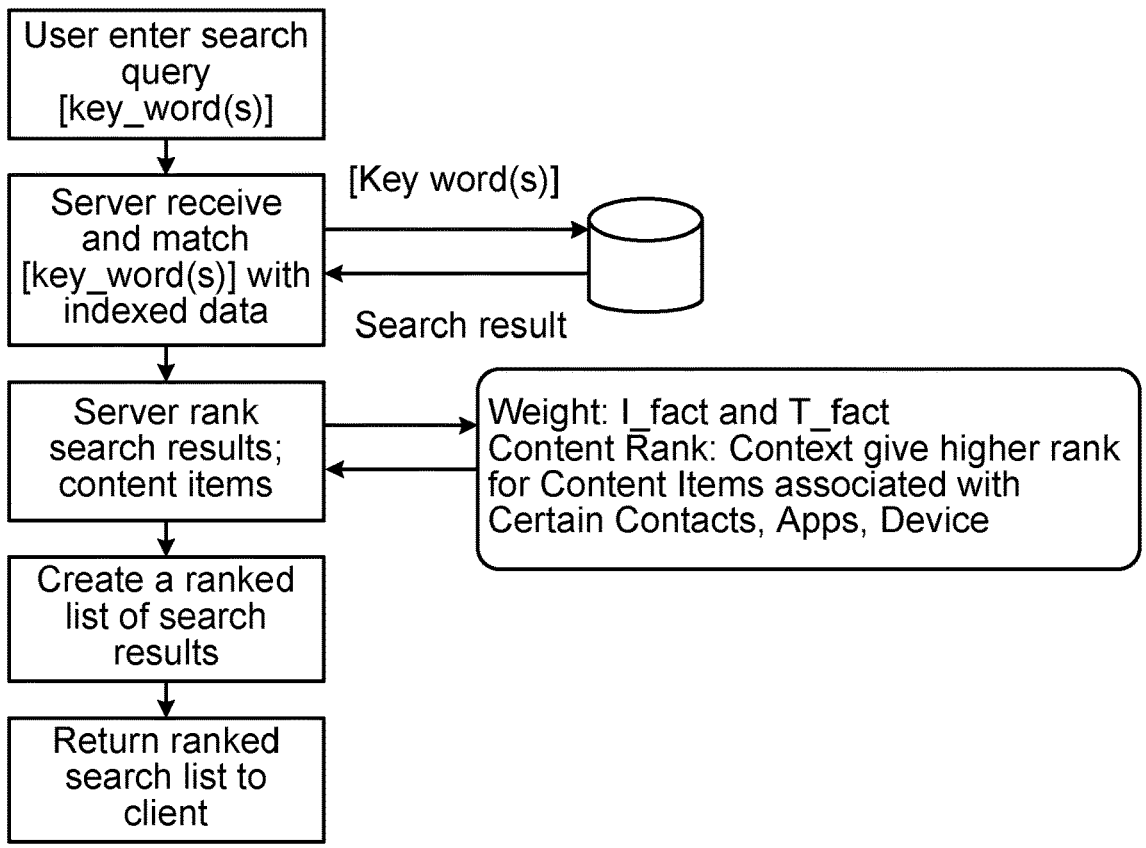
FIG. 8 is a schematic diagram illustrating search and rank of communication data for an embodiment presented herein.

Search and rank is described with reference to FIG. 8.

A user query, key_word(s), submitted via a client application or a web interface is sent to the connection manager server. Also, search query context parameters are submitted, such as device used, time of day, location and accelerometer data.

The connection manager server invokes a matching query (e.g. an SQL query) to an indexed database (e.g. MySQL), which results in a list of content_items matching the search query.

The connection manager server identifies contacts, that a user often has communication sessions with, matching, mached_item, the query context parameters resulting in a list of contacts, Contacts [1-m]. The relevance of matching sessions will in one embodiment decay exponentially back in time from the present time. The relevance is contemplated to have other decay back in time, such as linearly.

The server sorts and ranks the list of matching content_items using a content rank, calculated in the following way.

content rank(matched_item[1-$n$])=Weight+Item_Freq (Contacts [1-$m$])

Weight(content_item)=$N$($I$_Fact+$T$_Fact)

Item_Freq(Content_item[$n$])=Sum(content item hits for Contacts [1-$m$])

The context gives a higher rank for content items associated certain contacts, applications or devices.

In another example, it could be valuable to rank items based on contact weight. E.g. communication with contacts can impact contact weight by number of times close in time (time window).

The ranked list with content_items associated (e.g. through hyperlinks) with sessions and content stored in the historical database is returned to the user. The ranked list may be returned to the user through SMS or through the application through which the communication session was initiated.

Figure 4A:
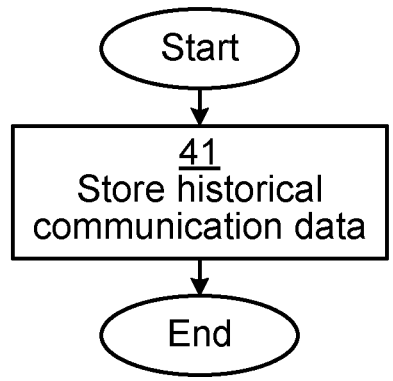
FIGS. 4a-4d are flow charts illustrating methods for embodiments presented herein.

A method, according to an embodiment, for managing communication data is presented with reference to FIG. 4a, which method is performed by a connection manager server 20. The method comprises the step of causing store 41 of historical communication data, for a communication session between a user and one or more contacts, into a database 13, wherein the historical communication data comprises communication data, a session identifier, a communication type, a communication context, and a user identifier for each contact having participated in the communication session.

The method may further comprise the step of causing receipt 40 of the historical communication data from a user equipment 10. This may be performed by an http request from the connection manager server 20 after a communication session, which will retrieve historical data from a UE and a user. The method may also comprise the step of causing store 41 of communication data for an ongoing communication session, to provide the historical communication data. This may be performed ongoing. This may also be performed by PHP and a MySQL call, such as mysql_query ("MySQL store historical data") from the connection manager server 20 after a communication session.

Figure 4B:
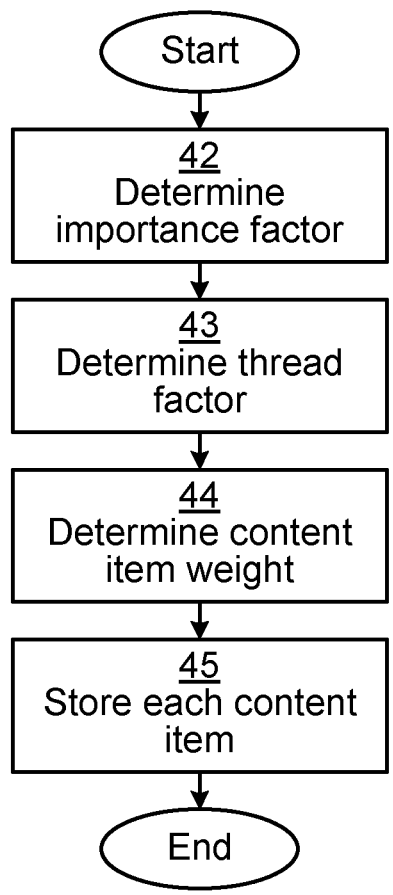

A method, according to an embodiment, for indexing communication data of a communication session between a user and one or more contacts, is presented with reference to FIG. 4b, which method is performed by a connection manager server 20. The method comprises the steps of: causing determination 42 of an importance factor for each of one or more content items for one or more content types of historical communication data for the communication session, wherein the historical communication data comprises a communication context; causing determination 43 of a thread factor for each of the one or more content items for the one or more content types of the historical communication data for the communication session; causing determination 44 of a content item weight for each content item for each content type, based on the determined importance factor and the determined thread factor; and causing store 45 of each content item, for each content type, in an index and associated with the content type, a session identifier, a communication context, and a content item weight. The causing store 45 of each content item may be performed an SQL or MySQL command to insert data (the content items) into a database.

The method may further comprise the steps of: causing identification of one or more content types of historical communication data of a communication session for the communication session; and causing identification of one or more content items for each identified content type. The method may also comprise the step of causing store of historical communication data as described above.

The importance factor may be calculated as: the number of contacts having participated in the communication session divided with the total number of contacts. The thread factor may be calculated as: the number of times each content item appear for the communication session, divided with the number of sessions. The thread factor may also dependent on a time window. The content item weight may be calculated as: the importance factor added to the thread factor, normalized to a content item weight interval.

The content type may be one or more of the following types: text, speech, audio, picture and video. The historical data may comprise one or more of the following: a session identifier, a user identifier for each contact having been part of the communication session, a group identifier, a communication type, a communication context, a user equipment type, and communication data.

Figure 4C:
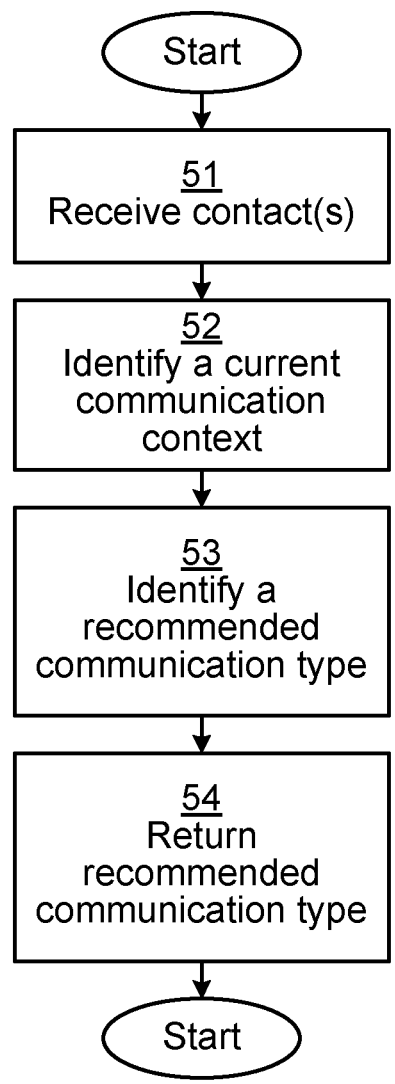

A method, according to an embodiment, for recommending a communication type to a user for a communication session, is presented with reference to FIG. 4c, which method is performed by a connection manager server 20. The method comprises the steps of: causing reception 51 of one or more contacts from the user; causing identification 52 of a current communication context for the user and the one or more contacts, respectively; causing identification 53 of a recommended communication type for the user and the one or more contacts, based on historical communication data; and causing return 54 of the identified recommended communication type to the user. The causing reception 51 may be provided by an http response from the connection manager server 20 to the UE 10, including selected contacts related to the communication session. The causing return 54 may be provided by an http response from the connection manager server 20 to the UE 10 with a recommended communication type.

The recommended communication type may be identified with a decision model. The method may comprise a step of causing building the decision model with historical communication data by machine learning from historical communication sessions of the user.

The step of causing identification of a recommended communication type may comprise identification of a ranked list of recommended communication types.

The method may further comprise the step of causing identification of, one or more of the following: a user equipment type, a group identifier, a communication type, and a content type, for the user and the one or more contacts, respectively. The method may also comprise the step of causing setup of a communication session between the user and the one or more contacts based on the recommended communication type.

A method, according to an embodiment, for ranking a search query result from communication data indexed as described above, is presented with reference to FIG. 4d, which method is performed by a connection manager server 20. The method comprises the steps of: causing reception 46 of a search query item from a user and associated with a communication context; causing identification 47 of one or more contacts of the indexed communication data, in dependence on the communication context, wherein the one or more contacts have had a communication session with the user; causing match 48 of the search query item with indexed content items;

causing rank 49 of the matched indexed content items, in dependence of content item weight; and causing return 50 of the ranked matched indexed content items associated with the search query item. The causing reception 46 of a search query item may be provided by a SQL or MySQL query "search query item". The causing return 50 may be provided by an http response with the ranked matched indexed content items.

The rank for each matched indexed content items may be calculated as: the content item weight added to a content item frequency. The content item frequency may be calculated as: number of times each indexed content item appear for all contacts of the user.

The communication context may comprise one or more of the following: user equipment, time of day, location, and accelerometer data.

Figure 4D:
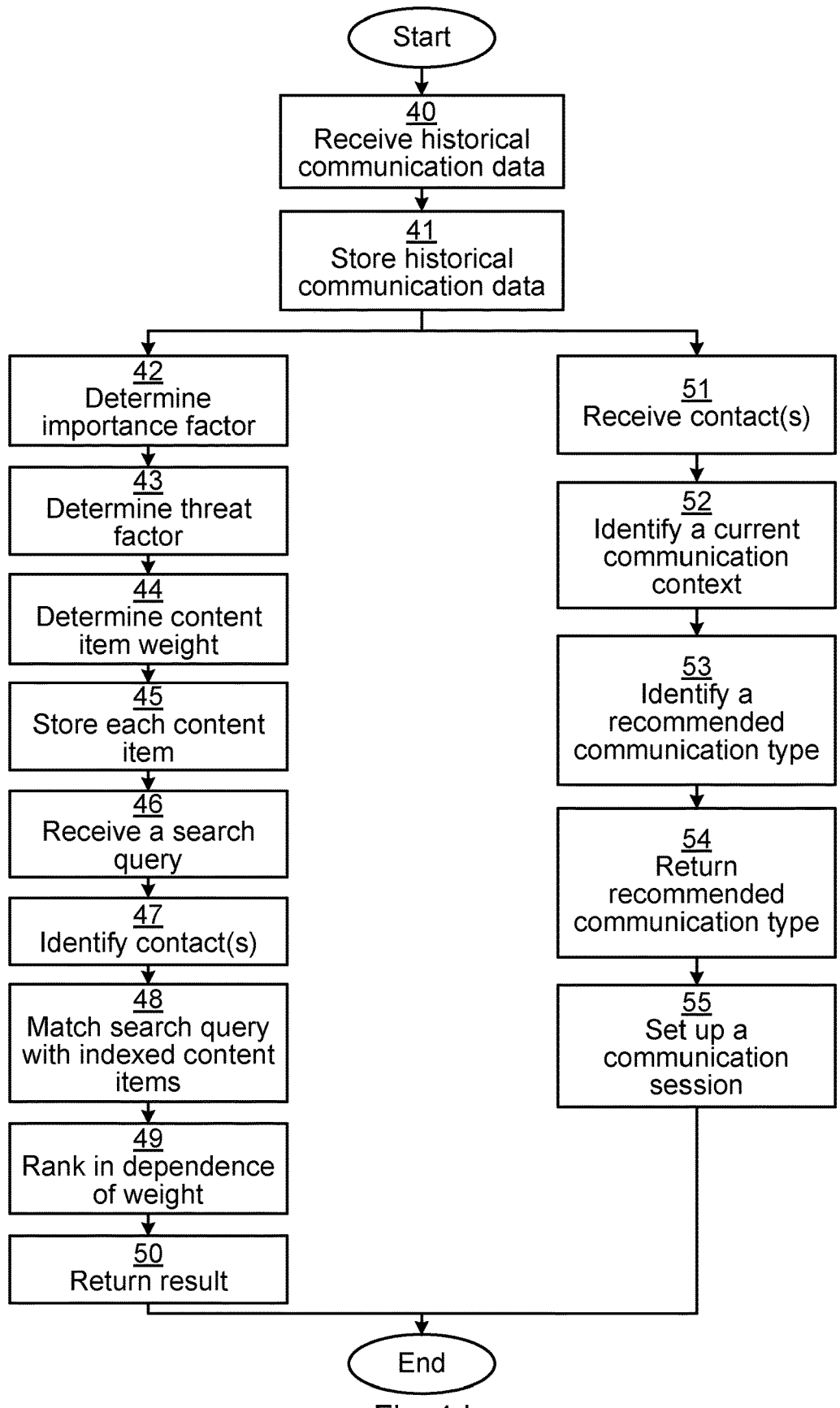

Although, as illustrated in FIG. 4d, the connection manager 20 may be used to handle all methods described above in a straight forward manner, each separate method may be initiated repeatedly or intermittently. Storing of historical data may e.g. be made continuously or retrospectively. Searches may e.g. be made afterwards or in parallel to other processes. Initiation of a communication session may e.g. be made afterwards or in parallel to other processes to get a recommended communication type.

Figure 9:
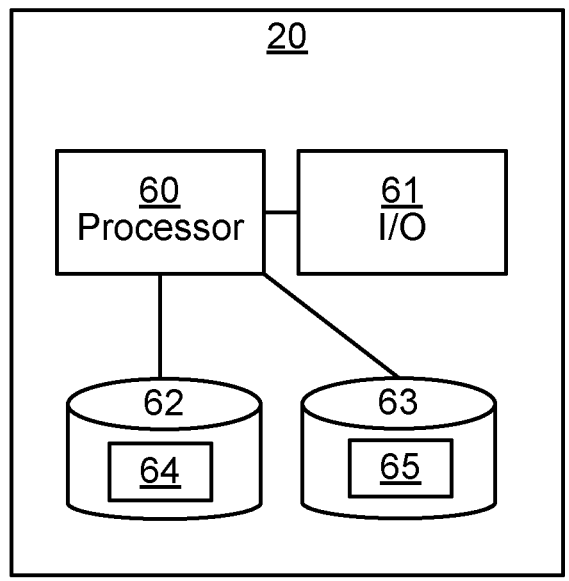
FIG. 9 is a schematic diagram illustrating details of a connection manager server for an embodiment presented herein.

A connection manager server 20, according to an embodiment, is presented with reference to FIG. 9, which connection manager server 20 is configured to manage communication data. The connection manger server 20 comprises: a processor 60; and a computer program product 62, 63 storing instructions that, when executed by the processor, causes the connection manger server 20 to cause store 41 of historical communication data, for a communication session between a user and one or more contacts, into a database 13, wherein the historical communication data comprises communication data, a session identifier, a communication type, a communication context, and a user identifier for each contact having participated in the communication session.

The instructions may comprise a further instruction to cause receipt 40 of the historical communication data from a user equipment 10. The instructions may also comprise a further instruction to cause store 41 of communication data for an ongoing communication session, to provide the historical communication data.

FIG. 9 is a schematic diagram showing some components of the connection manager server 20. The processor 60 may be provided using any combination of one or more of a suitable central processing unit (CPU), multiprocessor, microcontroller, digital signal processor (DSP), application specific integrated circuit etc., capable of executing software instructions of a computer program 64 stored in a memory. The memory can thus be considered to be or form part of the computer program product 62. The processor 60 may be configured to execute methods described herein with reference to FIGS. 4a-4d.

The memory may be any combination of read and write memory (RAM) and read only memory (ROM). The memory may also comprise persistent storage, which, for example, can be any single one or combination of magnetic memory, optical memory, solid state memory or even remotely mounted memory.

A second computer program product in the form of a data memory 63 may also be provided, e.g. for reading and/or storing data during execution of software instructions in the processor 60. The data memory 63 can be any combination of read and write memory (RAM) and read only memory (ROM) and may also comprise persistent storage, which, for example, can be any single one or combination of magnetic memory, optical memory, solid state memory or even remotely mounted memory. The data memory 63 may e.g. hold other software instructions 65, to improve functionality for the connection manager server 20.

The connection manager server 20 may further comprise an I/O interface 61 including e.g. a user interface. Other components of the network device are omitted in order not to obscure the concepts presented herein.

A connection manager server 20, according to an embodiment, is presented with reference to FIG. 9, which connection manager server 20 is configured to index communication data of a communication session between a user and one or more contacts. The connection manager server 20 comprises: a processor 60; and a computer program product 62, 63 storing instructions that, when executed by the processor, causes the connection manger server 20 to: cause determination 42 of an importance factor for each of one or more content items for one or more content types of historical communication data for the communication session, wherein the historical communication data comprises a communication context; cause determination 43 of a thread factor for each of the one or more content items for the one or more content types of the historical communication data for the communication session; cause determination 44 of a content item weight for each content item for each content type, based on the determined importance factor and the determined thread factor; and cause store 45 of each content item, for each content type, in an index and associated with the content type, a session identifier, a communication context, and a content item weight.

The instructions may comprise further instructions to: cause identification of one or more content types of historical communication data of a communication session for the communication session; and cause identification of one or more content items for each identified content type.

The instructions may also comprise a further instruction to cause store 41 of historical communication data as described above.

The importance factor may be calculated as: the number of contacts having participated in the communication session divided with the total number of contacts. The thread factor may be calculated as: the number of times each content item appear for the communication session, divided with the number of sessions. The thread factor may also be dependent on a time window. The content item weight may be calculated as: the importance factor added to the thread factor, normalized to a content item weight interval.

The content type may be one or more of the following: text, speech, audio, picture and video. The historical data may comprises one or more of the following: a session identifier, a user identifier for each contact having been part of the communication session, a group identifier, a communication type, a communication context, a user equipment type, and communication data.

A connection manager server 20, according to an embodiment, is presented with reference to FIG. 9, which connection manager server 20 is configured to rank a search query result from communication data indexed by the connection manger server. The connection manager server comprises: a processor 60; and a computer program product 62, 63 storing instructions that, when executed by the processor, causes the connection manger server 20 to: cause reception 46 of a search query item from a user and associated with a communication context; cause identification 47 of one or more contacts of the indexed communication data, in dependence on the communication context, wherein the one or more contacts have had a communication session with the user; cause match 48 of the search query item with indexed content items; cause rank 49 of the matched indexed content items, in dependence of content item weight; and cause return 50 of the ranked matched indexed content items associated with the search query item.

The rank for each matched indexed content items may be calculated as: the content item weight added to a content item frequency. The content item frequency may be calculated as: number of times each indexed content item appear for all contacts of the user.

The communication context may comprise one or more of the following: user equipment, time of day, location, and accelerometer data.

A connection manager server 20, according to an embodiment, is presented with reference to FIG. 9, which connection manager server 20 is configured to recommend a communication type to a user for a communication session. The connection manager server comprises: a processor 60; and a computer program product 62, 63 storing instructions that, when executed by the processor, causes the connection manger server 20 to: cause reception 51 of one or more contacts from the user; cause identification 52 of a current communication context for the user and the one or more contacts, respectively; cause identification 53 of a recommended communication type for the user and the one or more contacts, based on historical communication data; and cause return 54 of the identified recommended communication type to the user.

The recommended communication type may be identified with a decision model, e.g. in the form of a decision tree. The connection manager server may comprise an instruction to cause build of the decision model with historical communication data from historical communication sessions of the user.

The instruction to cause identification of a recommended communication type may comprise identification of a ranked list of recommended communication type.

The connection manager server may further comprise an instruction to cause identification of, one or more of the following: a user equipment type, a group identifier, a communication type, and a content type, for the user and the one or more contacts, respectively. The connection manager server may also comprise an instruction to cause setup 55 of a communication session between the user and the one or more contacts based on the recommended communication type.

Figure 10:
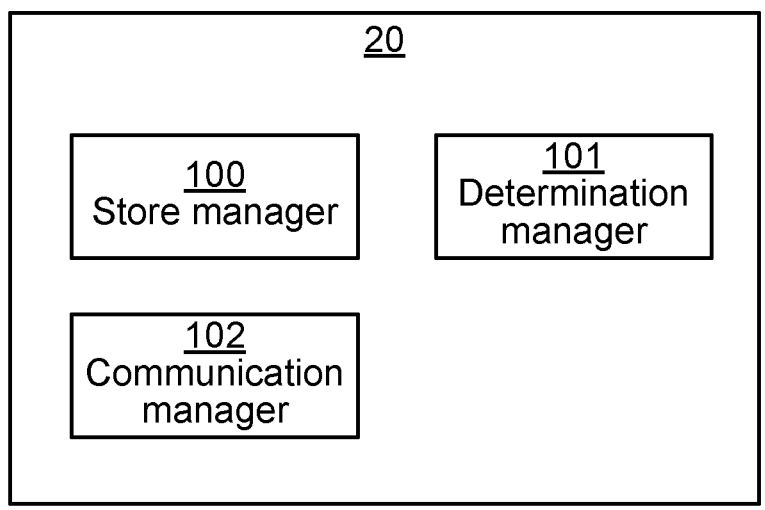
FIG. 10 is a schematic diagram showing functional modules of a connection manager.

FIG. 10 is a schematic diagram showing functional blocks of the connection manager server 20. The modules may be implemented as only software instructions such as a computer program executing in the connection manager server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIGS. 4a-4d, comprising a store manager 100, a determination manager 101 and a communication manager 102. In the embodiments where one or more of the modules are implemented by a computer program, then it shall be understood that these modules do not have to correspond to programming modules, but can be written as instructions according to the programming language in which they would be implemented, since some programming languages do not typically contain programming modules.

The store manager 100 is for storing historical communication data, for a communication session between a user and one or more contacts, into a database 13, wherein the historical communication data comprises communication data, a session identifier, a communication type, a communication context, and a user identifier for each contact having participated in the communication session. The store manager 100 may also be configured to store each content item, for each content type, in an index and associated with the content type, a session identifier, a communication context, and a content item weight. This module corresponds to the store steps 41 and 45 of FIGS. 4a, 4b and 4d. This module can e.g. be implemented by the processor 60 of FIG. 9, when running the computer program.

The determination manager 101 is for determining an importance factor for each of one or more content items for one or more content types of historical communication data for the communication session, wherein the historical communication data comprises a communication context; for determining a thread factor for each of the one or more content items for the one or more content types of the historical communication data for the communication session; and for determining a content item weight for each content item for each content type, based on the determined importance factor and the determined thread factor. The determination manager 101 may be for identifying one or more contacts of the indexed communication data, in dependence on the communication context, wherein the one or more contacts have had a communication session with the user; for matching the search query item with indexed content items; and for ranking the matched indexed content items, in dependence of content item weight. The determination manager 101 may also be for identifying a current communication context for the user and the one or more contacts, respectively; and for identifying a recommended communication type for the user and the one or more contacts, based on historical communication data. This module corresponds to the determination steps 42-44, the identification steps 47 and 52-53, the match step 48, and the rank step 49 of FIGS. 4b-4d. This module can e.g. be implemented by the processor 60 of FIG. 9, when running the computer program.

The communication manager 102 is configured to receive a search query item from a user and associated with a communication context, and to return the ranked matched indexed content items associated with the search query item. The communication manager 102 may also be configured to receive one or more contacts from the user, and to return the identified recommended communication type to the user. This module corresponds to the receive steps 46 and 51, the return steps 50 and 54, and the set up step 55 of FIGS. 4c-4d. This module can e.g. be implemented by the processor 60 of FIG. 9, when running the computer program.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A connection manager server configured to index communication data of a communication session between a user and one or more contacts, the connection manager server comprising:
   a processor; and
   a computer program product storing instructions that, when executed by the processor, cause the connection manager server to:
   cause determination of an importance factor for each of one or more content items for one or more content types of historical communication data for the communication session, wherein the historical communication data comprises a communication context;
   cause determination of a thread factor for each of the one or more content items for the one or more content types of the historical communication data for the communication session;
   cause determination of a content item weight for each content item for each content type, based on: the determined importance factor, the determined thread factor, and a content item weight interval, wherein the content item weight interval comprises a time window associated with the content item; and
   cause storage of each content item, for each content type, in an index and associated with the content type, a session identifier, the communication context, and the content item weight.

2. The connection manager server of claim 1, wherein the instructions comprise further instructions to:
   cause identification of the one or more content types of the historical communication data for the communication session; and
   cause identification of the one or more content items for each identified content type.

3. The connection manager server of claim 1, wherein the instructions comprise a further instruction to:
   cause storage of the historical communication data for the communication session between the user and the one or more contacts, into a database, wherein the historical communication data comprises communication data, the session identifier, a communication type, the communication context, and a user identifier for each contact having participated in the communication session.

4. The connection manager server of claim 1, wherein the importance factor is calculated as: the number of contacts having participated in the communication session divided with the total number of contacts.

5. The connection manager server of claim 1, wherein the thread factor is calculated as: the number of times each content item appears for the communication session, divided with the number of sessions.

6. The connection manager server of claim 5, wherein the thread factor is dependent on a time window.

7. The connection manager server of claim 1, wherein the content item weight is calculated as: the importance factor added to the thread factor, normalized to the content item weight interval.

8. The connection manager server of claim 1, wherein the content type is one or more of the following: text, speech, audio, picture, and video.

9. The connection manager server of claim 1, wherein the historical communication data comprises one or more of the following: the session identifier, a user identifier for each contact having been part of the communication session, a group identifier, a communication type, the communication context, a user equipment type, and the communication data.

* * * * *